Sept. 26, 1933.    G. W. ESCHENBACH    1,928,012
PANORAMIC PICTORIAL ADVERTISING DISPLAY APPARATUS
Filed May 6, 1932    7 Sheets-Sheet 1

Inventor.
Gustavus W. Eschenbach
By
Lockwood & Lockwood
His Attorneys.

Sept. 26, 1933.  G. W. ESCHENBACH  1,928,012
PANORAMIC PICTORIAL ADVERTISING DISPLAY APPARATUS
Filed May 6, 1932  7 Sheets-Sheet 2
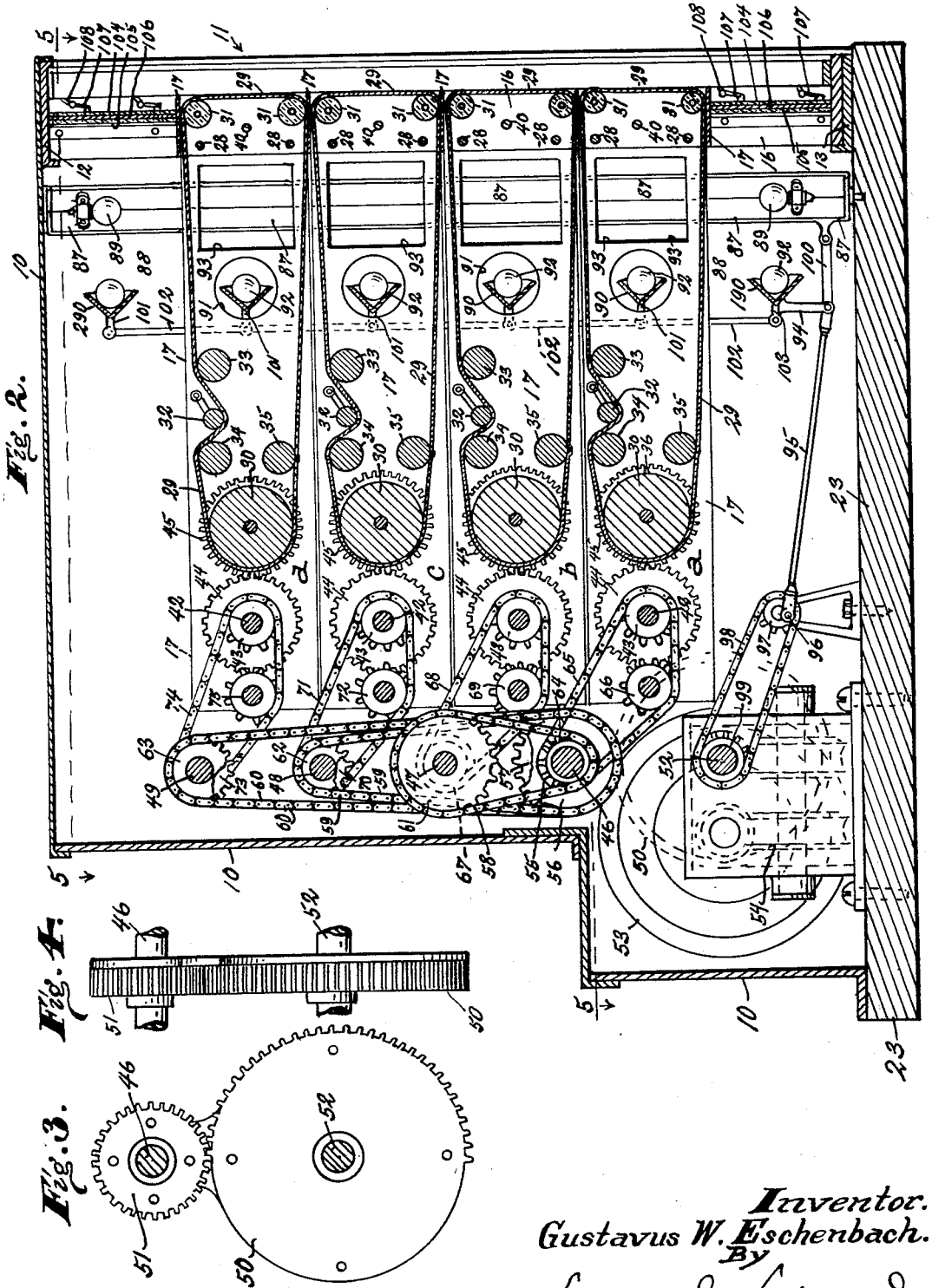
Inventor.
Gustavus W. Eschenbach.
By
Lockwood & Lockwood,
His Attorneys.

Sept. 26, 1933. G. W. ESCHENBACH 1,928,012
PANORAMIC PICTORIAL ADVERTISING DISPLAY APPARATUS
Filed May 6, 1932 7 Sheets-Sheet 3
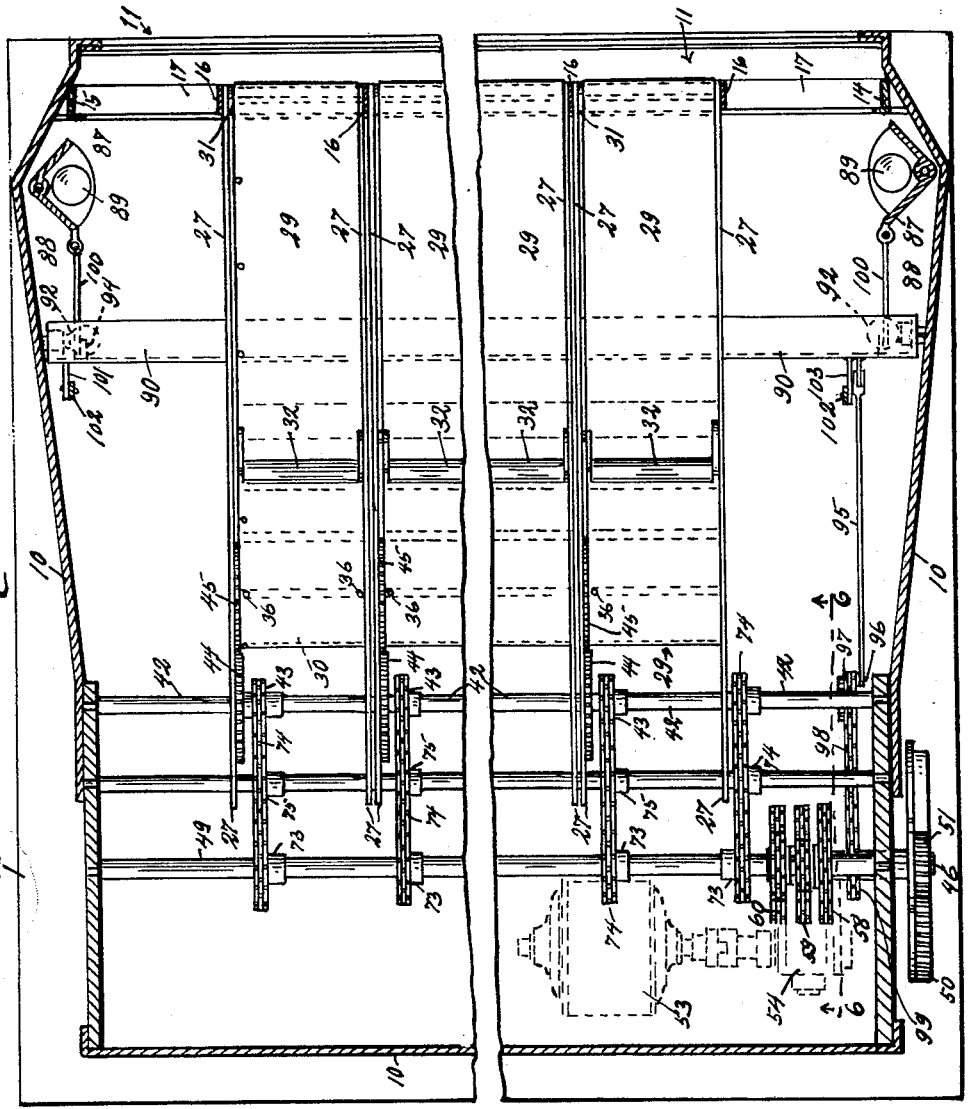
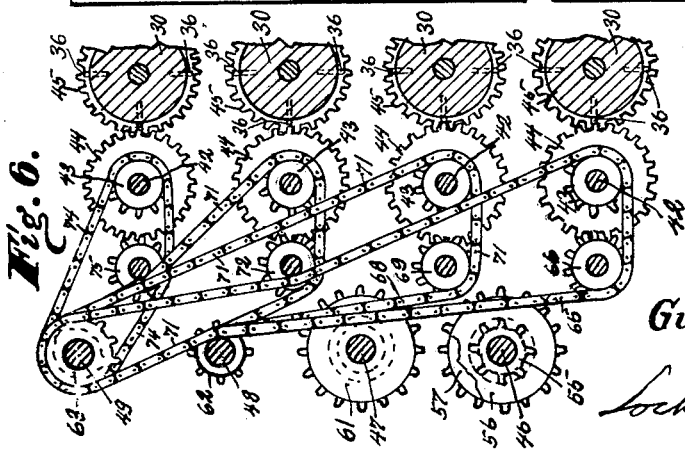
Inventor
Gustavus W. Eschenbach
By
Lockwood & Lockwood
His Attorneys.

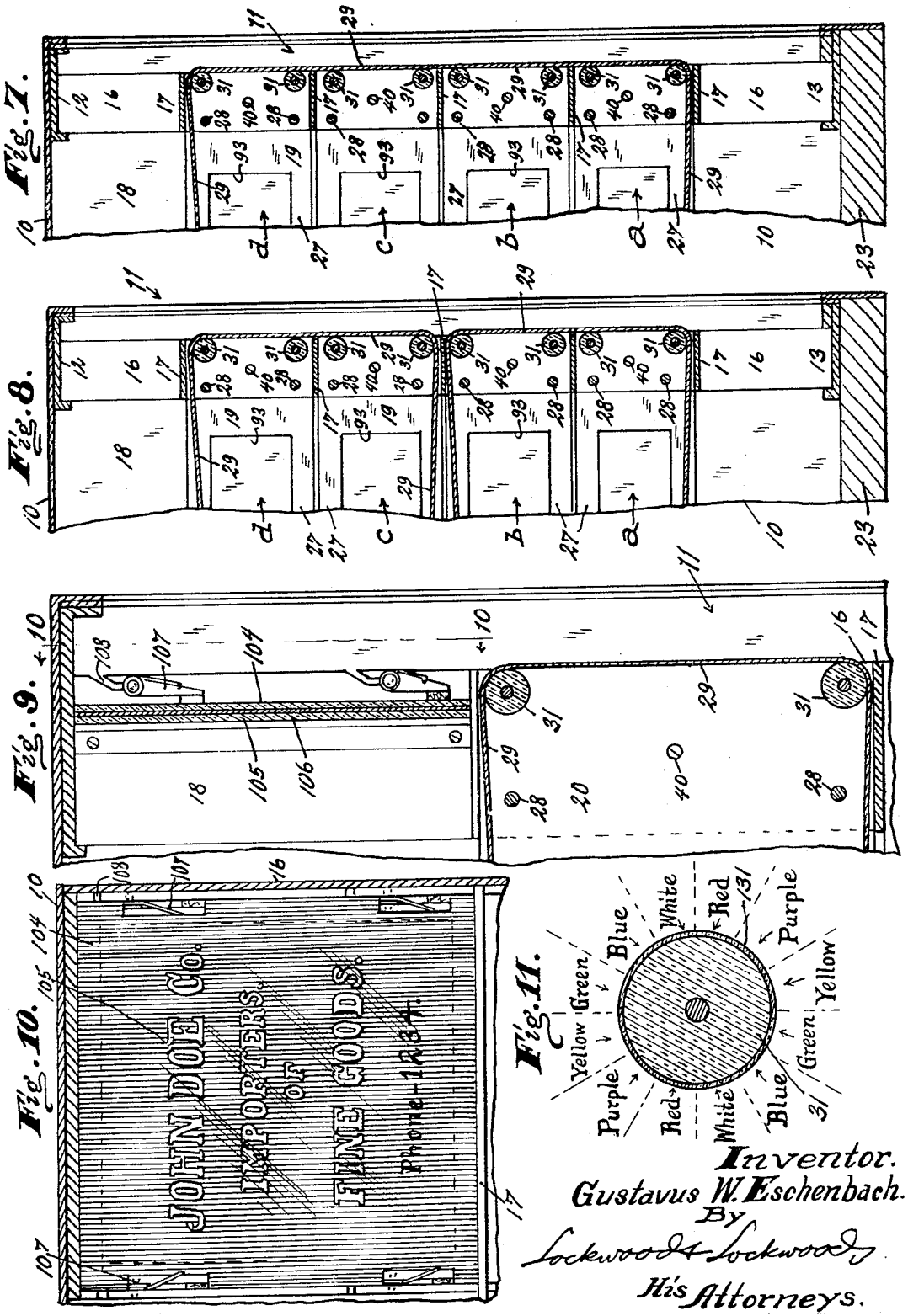

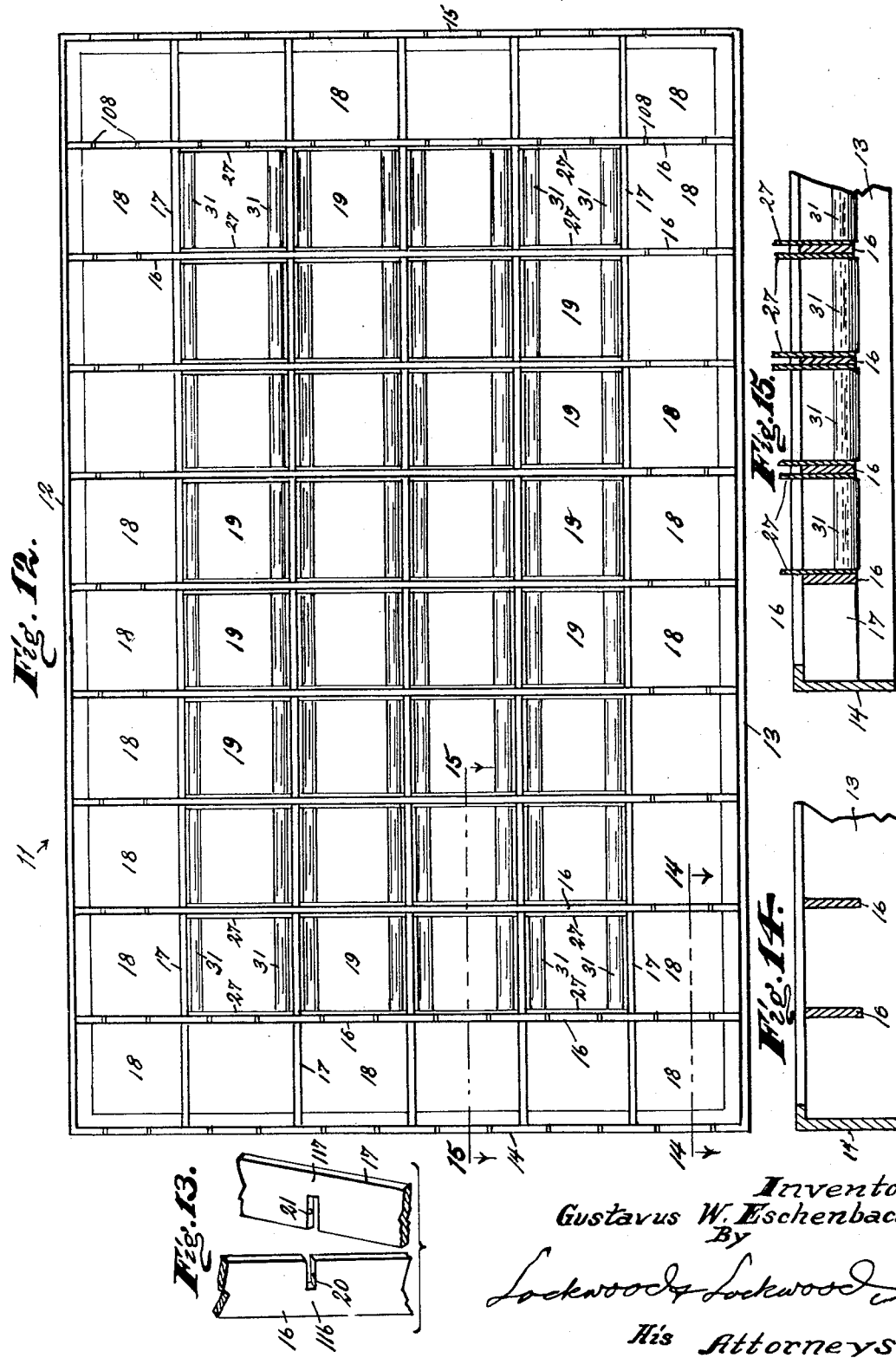

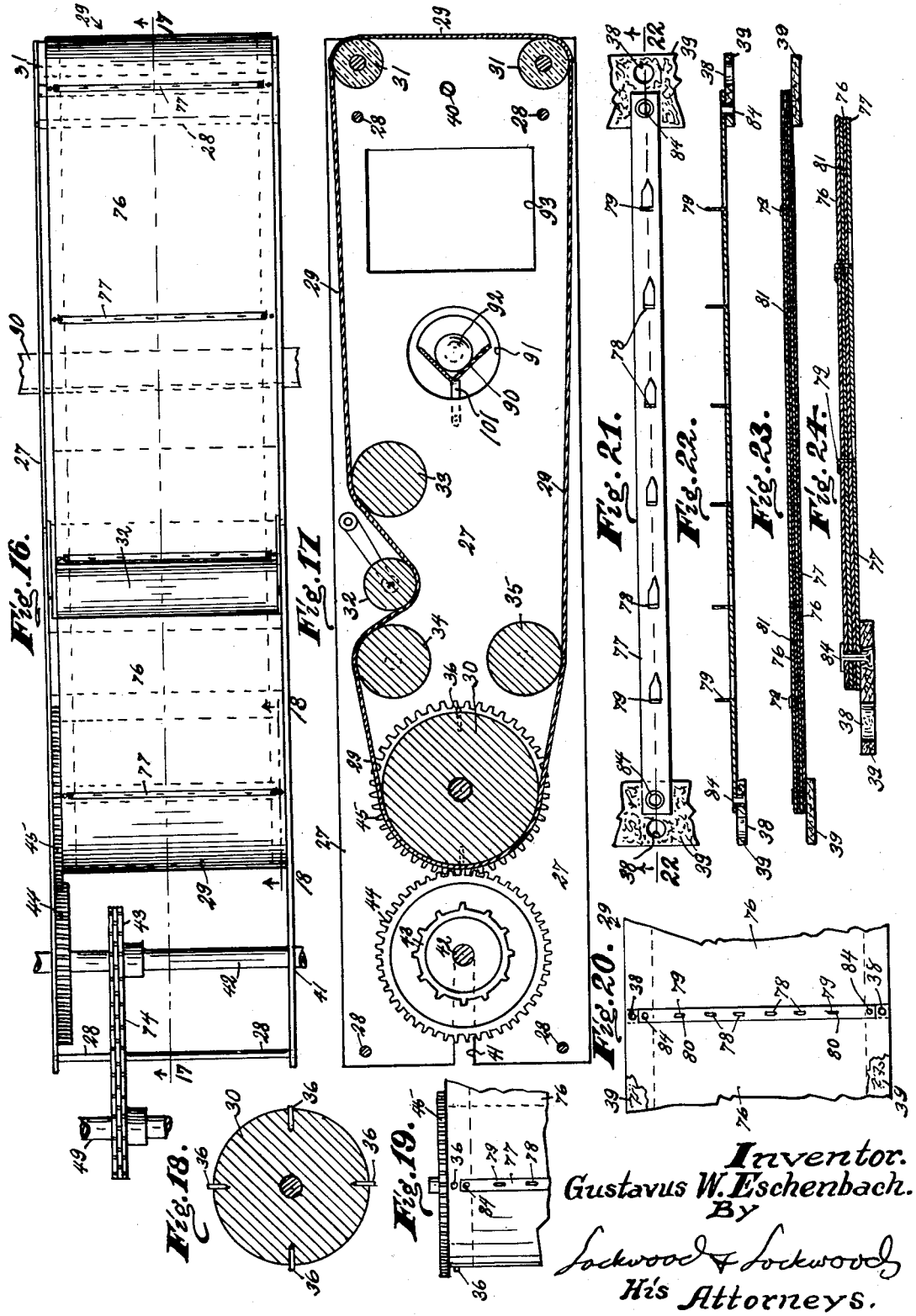

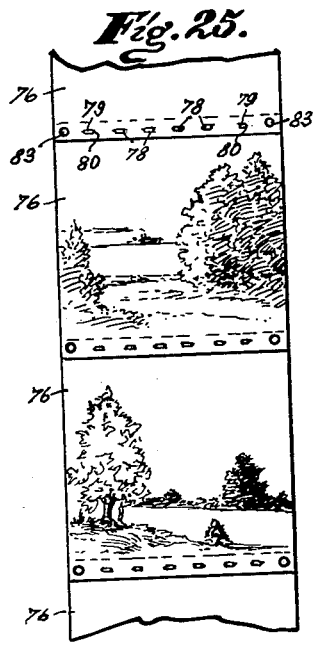
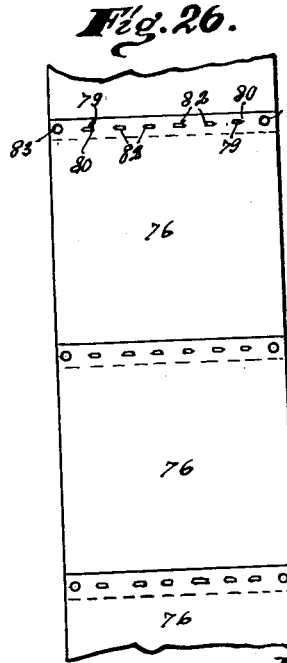
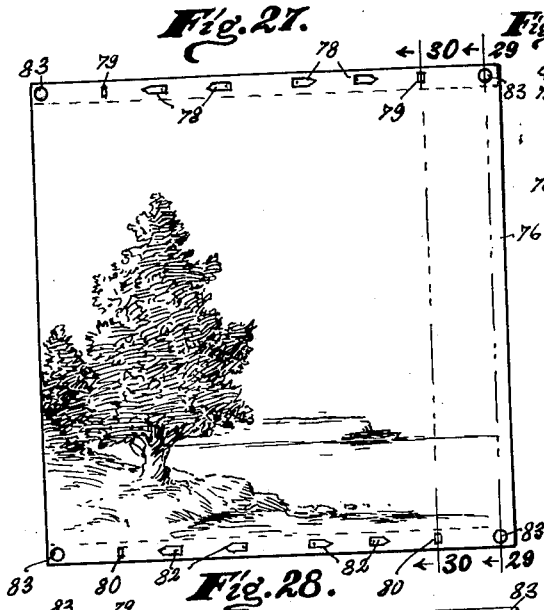
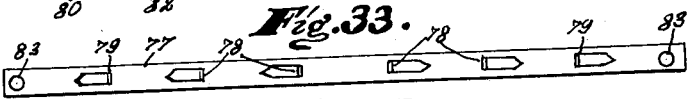
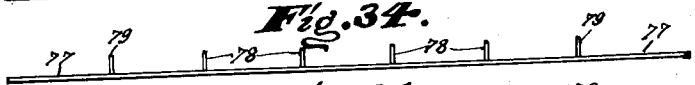
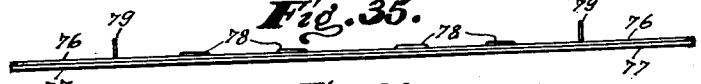
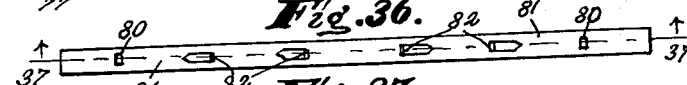
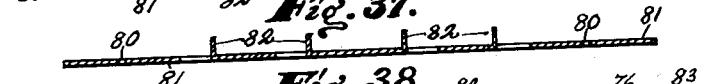
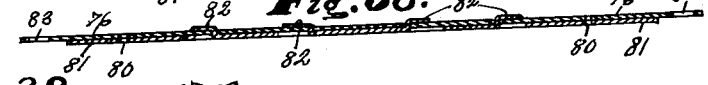
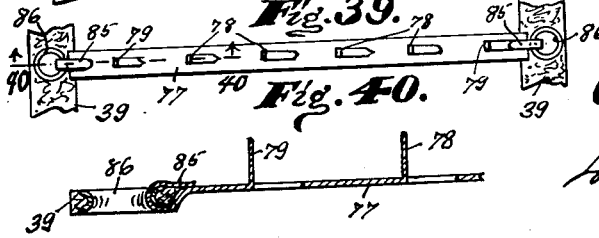

Patented Sept. 26, 1933

1,928,012

UNITED STATES PATENT OFFICE 1,928,012

PANORAMIC PICTORIAL ADVERTISING DISPLAY APPARATUS

Gustavus W. Eschenbach, Los Angeles, Calif.

Application May 6, 1932. Serial No. 609,695

15 Claims. (Cl. 40—32)

This invention is an improvement on my interchangeable block bill board patented June 9, 1931, No. 1,809,378, and the principal object is to improve the construction, combination and arrangement of parts of the bill-board apparatus whereby it will be much easier to construct, assemble and operate and much more accurate as to the timing of the intermittently moving parts, and which also is much more durable in use and attractive in appearance.

An object of this invention is to provide an open front advertising apparatus that is unusually attractive so that it will hold the attention of the public for a long time so that in an indirect manner the observers will become familiarized with the advertising on the board while watching the automatic changes in the panoramic pictures associated with the advertising matter. To that end I provide an apparatus having an open front or face in the form of a bill-board with the face made up of a series of units that can all be used independently of one another or used to coact with one another to produce marvelous results in the way of displaying advertising. Preferably the units having moving picture films movable intermittently across their faces in a prearranged order are surrounded by stationary units arranged in the form of a picture frame that, in addition to having pictorial advertising thereon, are also brilliantly lighted with fluctuating colored lights that attract the attention to the pictorial advertising on the stationary units.

A feature of invention is shown in the means for intermittently driving the films of the units at various speeds or so that one or more of the films travel at a greater speed than the other with the driving means so constructed that the films can all be moved at the same speed; but preferably some of the films are driven at a slow speed, others at an intermediate speed and still others at a high speed. To that end I provide a main shaft which, when connected to the motion picture units, drives them at a uniform speed and above this shaft I arrange shafts for three other speeds, that is, low, intermediate and high speed, with the gears thereon arranged to drive the films in a stepped relationship to one another. That is, if the slow speed shaft is intermittently driven to move a film a distance equal to the length across the face of a unit, the other shafts can be driven twice and three times that distance, it being understood that the stepped relationship between these movements is determined by the length across the face of a unit, all the units being equal relative to their face dimensions.

In other words, the endless films are all of the same length and they are made up of a number of pictorial advertising scenes, each equal in area and form so that when intermittently moved one or more steps they will stop in exact register with the face of the unit with which they are connected so that regardless as to the speed they are driven the films all stop in position to form their respective part of a panoramic scene. It is understood that, if desired, all the films are driven at the same speed if all are connected to the same shaft.

Another object of the invention is to provide a bill-board having an open front so that pictorial advertising scenes can be inserted into the spaces of the stationary units from the front and also the films of the motion picture units can be changed from the front. That is, an entire endless film can be removed and replaced by another one or one or more sections can be removed from any or all the films and replaced by others from the front of the bill-board so that none of the mechanism of the apparatus need be disturbed while changing from one advertising to another.

A feature of invention is shown in the means for illuminating the moving picture scenes as well as the scenes on the stationary units that form a picture frame around the moving films, which means includes a pair of trough-like reflectors with electric lamps therein arranged adjacent the front and at the sides of the apparatus, and also horizontal trough-like reflectors that extend cross-wise through the apparatus, all of which are rocked by a connection to the drive shaft of the apparatus so that when in operation the reflected lights will be swept both vertically and horizontally over the inner surfaces of the plates or films that close the outer ends of the units, whereby a varied lighting effect will appear on the face of the bill-board.

Another feature of invention is shown in arranging transparent rollers at the outer ends of the units over which the motion picture films are driven so that the entire area of the films over the front of the units will be fully illuminated. It is understood that these transparent rollers can be in the form of glow bars to throw their varied color lights on the surfaces of the films exposed to view.

Another feature of invention is shown in the construction of the endless films and support thereof, whereby sections can be removed and replaced at will. This feature of invention includes the endless tapes that take the strain off the film sections and also includes the detachable cross bars that lock adjacent edges of the film sections together to form an endless picture film.

Other objects, advantages and features of invention may appear from the accompanying drawings, the subjoined detailed description and the appended claims.

The accompanying drawings illustrate the invention, in which:

Fig. 2 is a vertical section on line 2—2, Fig. 1, with some of the parts indicated semi-diagrammatically and others omitted; and showing the motion picture films, as endless belts.

Fig. 3 is a side view of the gears for intermittently driving the moving picture films.

Fig. 4 is a view of the gears at right angles to that shown in Fig. 3.

Fig. 5 is a fragmental section on line 5—5, Fig. 2, showing a plan view of the mechanism for actuating the moving picture films and rocking the trough reflectors.

Fig. 6 is a cross section on line 6—6, Fig. 5, with parts omitted showing the driving connections from a single drive shaft to the film driving rollers.

Fig. 7 is a fragmental sectional view analogous to the right hand end portion of Fig. 2, showing center moving picture units idle and the film of the top and bottom units extended across their front ends and engaging their transparent glow bar rollers.

Fig. 8 is a view analogous to Fig. 7, showing moving picture films extended across the fronts of the upper and lower units so they operate in pairs.

Fig. 9 is an enlarged fragmental section analogous to the upper portion of Fig. 8 showing the detailed construction of one of the stationary units and means for holding and replacing pictorial advertising therein.

Fig. 10 is a fragmental sectional view on line 10—10, Fig. 9, showing one of the stationary advertising picture blocks in a front elevation.

Fig. 11 is an enlarged cross section through one of the transparent glow bar rollers showing the preferred form of constructing them.

Fig. 12 is a front elevation of the skeleton frame detached from the apparatus showing the pairs of parallel bars and transparent roller in the inner rectangular openings.

Fig. 13 is a fragmental perspective view of a horizontal and vertical plate showing how they are slotted so as to be fitted together at right angles to one another.

Fig. 14 is a fragmental section on line 14—14 of Fig. 12.

Fig. 15 is a fragmental section on line 15—15, Fig. 12, showing the arrangement of the pairs of parallel bars and rollers as related to the skeleton frame.

Fig. 16 is a plan view of one of the moving picture units with the driving means and rocking light reflector shown fragmentally.

Fig. 17 is a longitudinal section on line 17—17, Fig. 16, showing the detailed construction of the rollers for moving the picture film, the latter being shown semi-diagrammatically and as an endless belt.

Fig. 18 is a section on line 18—18, Fig. 16, showing the feed roller with its spaced pins, and omitting the end gear and endless film for the sake of clearness in the drawing.

Fig. 19 is a fragmental plan view of the feed roller and endless film showing the latter provided with one of the link clips that aid in connecting the sections of the film together.

Fig. 20 is a fragmental plan view of a sectional picture film.

Fig. 21 is a fragmental plan view of one of the link clips and parallel tapes for connecting and reinforcing the film parts or sections.

Fig. 22 is a section on the line 22—22 of Fig. 21, showing the barbs of the link clip before they have been clinched to join adjacent ends of film sections.

Fig. 23 is a section analogous to Fig. 22, with the barbs clinched to join adjacent edges of film sections.

Fig. 24 is an enlarged fragmental view of the left hand portion of Fig. 23.

Fig. 25 is a fragmental front view of a film formed of joined sections.

Fig. 26 is a back view of the film shown in Fig. 25.

Fig. 27 is an enlarged front view of a film section shown reinforced by top and bottom link clips.

Fig. 28 is a fragmental back view of the film section shown in Fig. 27.

Fig. 29 is an enlarged section on line 29—29 of Fig. 27.

Fig. 30 is also an enlarged section on line 30—30 of Fig. 27.

Fig. 31 is a fragmental sectional view showing the top of one section as first attached to the bottom of another section.

Fig. 32 is a view analogous to Fig. 31 with the barbs clinched to hold the parts together.

Fig. 33 is a plan view of the top link clip.

Fig. 34 is an edge view of the clip shown in Fig. 33.

Fig. 35 is a view analogous to Fig. 34 with a film edge secured to the clip by four of the inner barbs leaving the end barbs extended for connecting to the lower edge of the other film section.

Fig. 36 is a plan view of one of the lower link clips showing center barbs for securing the film to the clip; and also end slots for securing the end barbs of the top link clips.

Fig. 37 is a central section on the line 37—37 Fig. 36.

Fig. 38 is a view analogous to Fig. 37 showing a film secured to the clip.

Fig. 39 is a modified form of link clip showing it connected to eyelets in oppositely arranged reinforcing tapes.

Fig. 40 is an enlarged fragmental section on the line 40—40 Fig. 39.

Figure 1:
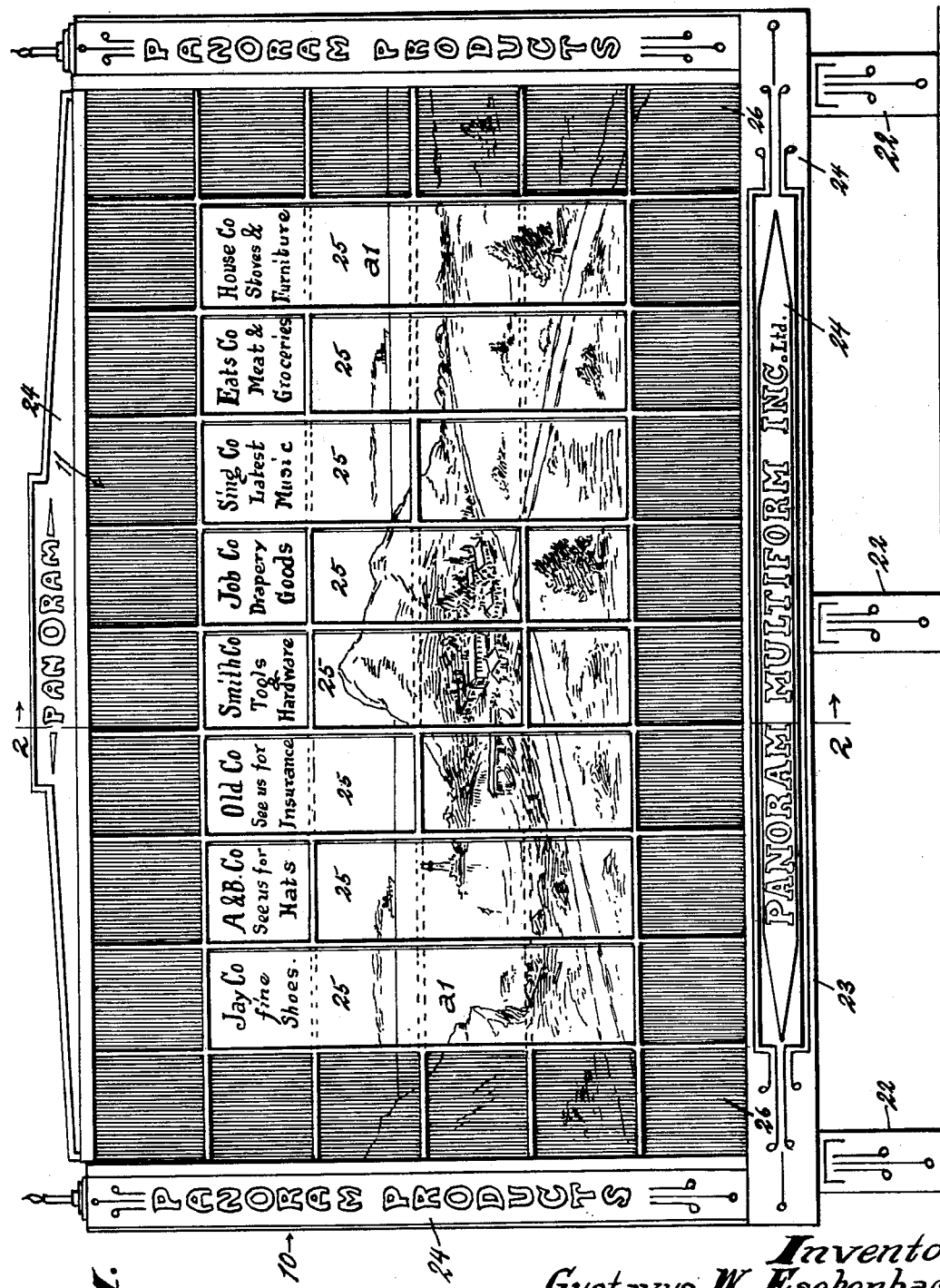
Figure 1 is a front elevation of a panoramic pictorial advertising display apparatus that is constructed in accordance with this invention, showing moving advertising picture films in the center portion of the apparatus that are surrounded by a number of stationary units arranged in the form of a picture frame.

The apparatus includes a housing 10 having an open front in which a skeleton frame 11 is secured. This frame includes the top and bottom angle irons 12 and 13 and the end angle irons 14 and 15 that have adjacent ends integral to form a solid frame in which the vertical bars 16 and horizontal bars 17 are secured and arranged to form the exterior and interior openings 18 and 19 between them.

The bars 16 and 17 are provided with slots 20 and 21 at their intersecting points so that they fit together to form a very rigid frame with the rectangular openings between them. This slotting of the bars 16 and 17 is illustrated in Fig. 13 and, as seen therein, when the bar 16 is moved toward the bar 17 the parts will telescope together with the part 116 sliding into the slot 21 and the part 117 sliding into the slot 20 with the bars substantially at right angles to one another. The ends of these bars can be secured in the frame 11 in any suitable manner, as by brazing.

Preferably the apparatus 10 is constructed in the form of a bill-board with an open front and supported on posts 22 and platform 23 as indicated in Fig. 1, and when so used is provided with an ornamental outer frame 24 in which relatively permanent advertising matter can be shown. By this arrangement of parts the moving picture units 25 are surrounded by a frame of stationary but interchangeable advertising units 26 that form an inner changeable frame within the outer frame 24.

The moving picture units 25 will first be described and as all are constructed substantially alike a description of one and its driving means will describe all.

Each unit 25 includes the parallel side plates 27 that are secured together by cross spacing rods 28 and between the plates the means for moving the endless films 29 are rotatably secured. In many places in the drawings the spacing rods 28 and other mechanism are omitted for the sake of clearness in the drawings, but these parts are shown in detail in Figs. 16 and 17.

The means for moving the endless films 29 include the feed roller 30 adjacent the rear end of the unit, and in the front end thereof and adjacent the top and bottom are a pair of transparent glow bar rollers 31 over which the film 29 is extended and kept taut by the weight of an idle roller 32 that holds the film in relatively tight contact with the glow bar rollers and also in contact with the idle guide rollers 33, 34 and 35, all of which have reduced ends or shafts journaled in sides 27.

The roller 30 is provided with spaced feed pins 36 that are arranged to extend through spaced holes 37 in the films 29 or similar holes 38 in the reinforcing tapes 39 on which the films 29 are preferably carried, it being understood that when the films 29 are carried on the reinforcing tapes 39 that the holes 37 through the film and holes 38 through the tape are in register.

The moving picture units 25 are constructed so they are interchangeable in the inner openings 19 of the frame 11 or so that any one of the units can be fitted into any of the openings 19, and they are detachably secured therein by the oppositely arranged screws 40, see Figs. 7, 8, 9 and 17.

Also each of the units 25 adjacent its rear end is provided with registering slots 41 in the sides 17 for the drive shafts 42 on which the sprocket and gear wheels 43 and 44 are mounted. That is, the sides 17 of each unit of each horizontal tier $a$, $b$, $c$ and $d$ are slotted to receive their respective shaft 42 which is provided with a sprocket 43 and gear 44 thereon for each of the respective units of each tier and each of the gears 44 meshes with its respective sprocket 45 secured on the end of each film drive roller 30.

The slots 41 are arranged in the inner ends of the sides 17 so the units can be inserted through the openings 19 and extended rearwardly until the shaft 42 enters the slots 41 and also until the teeth of gear 45 are in proper mesh with the teeth of gears 44, after which the unit or units are secured in place.

It is obvious that any or all of the moving picture units can be removed from the apparatus from the open front thereof for interchanging the units or repairing them when they get out of order.

In driving connection with the shafts 42 are the four shafts 46, 47, 48 and 49 that vary as to the speed at which they are driven and the driving means is through the intermittent gears 50 and 51.

As semidiagrammatically shown in Figs. 2 and 3, the mutilated gear 50 is mounted on shaft 52, and when the apparatus is in use, is constantly driven by a motor 53 through a speed reduction apparatus 54. The motor, speed reduction appliance and intermittent gears 50 and 51 are old in the art so they are not shown or described in complete detail, it being understood that at each revolution of the shaft 52 the gear 51 is also given one complete turn, thereby rotating the shaft 46.

Sprocket wheels 55, 56 and 57 are secured on the shaft 46 and connected by chains 58, 59 and 60 to sprockets 61, 62 and 63 on the respective shafts 47, 48 and 49 so that when the shaft 46 is intermittently rotated the other shafts and gears just mentioned will be driven. The chains and sprockets are arranged so that all the films of the moving picture units can be driven at the same speed or at different speeds by placing them in driving connection with one or all of the shafts 46 to 49 respectively.

As illustrated in Fig. 2, the tier $a$ of moving picture units 25 is in driving connection with the shaft 46 through sprocket 64, chains 65, sprocket 43, and idle sprocket 66, it being understood that each of the units of tier $a$ is so connected; and this driving connection will rotate the shaft 42 twice which in turn will move the films of the lower tier twice the distance across the front faces of the units.

The tier $b$ of moving picture films is in driving connection with the shaft 47 through sprocket 67, chains 68 and sprockets 43 and idle sprocket 69, and the gear relation is such that the rotation of shaft 46 moves the films in tier of units $b$ one step or a distance equal to that across the face of the units 25.

The tier $c$ of moving picture units is in driving connection with the shaft 48 through sprocket 70, chain 71, sprocket 43 and idle sprocket 72. The shaft 48 is geared to make four revolutions to one revolution of the shaft 46 so it moves the films in tiers of units $c$ four times the distance across the faces of the units. The shaft 42 in tier $d$ is in driving connection with the shaft 49 through sprocket 73, chain 74, sprocket 43 and idle sprocket 75 and moves the film 29 three times the distance across the face of a unit 25.

It is also obvious that, as shown in Fig. 6, all of the tiers of units can be placed in driving connection with any one of the shafts 46 to 49 inclusive but, for the sake of clearness, they are only shown in driving connection with the shaft 49.

The units 25 have open tops and bottoms so they can be connected together in pairs, triplets and quadruplets. This feature of invention is illustrated in Figs. 1, 7 and 8 and, as shown in Figs. 1 and 7 the films $a$—1 extend from the bottom to the top of the units riding idly over the roller 31 of the intermediate units, in which event the films are extended so they ride over the upper rollers in the units $d$ and under the rollers of units $a$, it being understood, of course, that when so used the film is endless and of sufficient length to reach over the rollers as described, and also that only one of the rollers 30 is driven.

In Fig. 8 the tiers of units *a* and *b* and also *c* and *d* are coupled together. It is obvious that any three of the units can be coupled together as described.

In Figs. 1, 2, 5, 7, 8, 9 and 17 the films 29 are semi-diagrammatically shown as endless belts or aprons but in practice they are formed as illustrated in Figs. 16, and 19 to 40 inclusive. As best shown in Figs. 25 to 28, inclusive, the films 29 are made up of detachable sections 76, each of which is provided with an upper link clip 77, but has the inner brads 78 adapted to clinch and hold the upper edge of the film section with two end brads 79 adapted to be extended through slots 80 in the lower link clip 81 that is secured to the lower edge of the film section by brads 82.

The link clip 77 has end holes 83 and the film has holes 37 at both the top and bottom of its side edges that register and receive the pins 36 on the drive rollers 30 by which means the films are driven.

If desired the edges of the films can be reinforced by tapes 39 that can be connected to the link clips 77 in various ways. Two of these ways are illustrated in Figs. 21 to 24 and 39 and 40.

In Figs. 21 to 24 the tapes 39 are connected to the link clips 77 by eyelets 84 with the driving holes 38 offset from the ends of the clip 77, it being understood that when the film sections 76 are connected to this form of carrier their outer edges are carried flush with the outer edges of the tapes.

In Figs. 39 and 40 the clip 77 is shown with end extensions 85 that hook into eyelets 86 secured centrally in the tapes 39. The purpose of the link clips 77 and 81 is to facilitate the changing of the film section from the front of the apparatus so as not to disturb the interior mechanism of the apparatus or remove the units. It is obvious that by disconnecting the brads 79 from the recesses 80 that the upper link clip 77 can be removed from the lower clip 81 of an adjacent film section so it can be removed and replaced by a similar film section, or interchanged with another film section.

It is understood that the films 29 are transparent and I arrange electric lamps back of them for illuminating the pictorial advertising matter thereon.

The lighting means includes the vertical reflector troughs 87 pivotally mounted in recesses 88 adjacent the front and to the sides of the apparatus as best shown in Fig. 5 and these troughs are provided with electric lamps 89.

Also I provide horizontal reflector troughs 90 that extend through windows 91 through the sides of the units 25 and have their ends pivotally mounted in the side walls of the apparatus and these troughs are provided with lamps 92, and also there is a trough 190 and 290, both above and below the units 25, as best shown in Fig. 2. Also there are other windows 93 through the sides 17 adjacent the vertical troughs 87 so that the lights from the lamps 89 can enter the units 25.

The bottom trough 190 is provided with an arm 94 that is connected by a rod 95 to an eccentric pin 96 on the sprocket 97 that is in driving connection with the shaft 52 by a chain 98 and sprocket 99 so that when the apparatus is in use the reflector trough 190 will be constantly rocked on its pivoted ends.

There is an arm 94 at each end of the trough 190 that is connected to its respective vertical trough 87 by a link 100; and also the horizontal troughs 90 and 290 are provided with rearwardly extending arms 101 that are connected by a link 102 with an arm 103 on the trough 190 so that when the shaft 52 is driven all of the troughs will rock together to throw their varied lights through the interior of the apparatus and preferably the interior wall of the apparatus are reflectors of light to brightly illuminate the films 29 when operated to display pictorial panoramic advertising.

The stationary pictorial units that are detachably placed in the openings 28 and which form an inner frame around the moving picture films are constructed as shown in my prior patent heretofore mentioned. These units, as best shown in Figs. 9 and 10 consist of inner and outer transparent colored plates 104 and 105 with sheets 106 of pictorial advertising thereon between them and they are held in place by clamps 107 that are detachably inserted in the slots 108 as described in my prior patent.

It is obvious that the stationary units are changeable or interchangeable and that also the moving picture units can be interchanged with one another or operated as described. As the operation of the apparatus has been fully described, for the sake of brevity, it is not repeated.

The glow bars 31 are made of transparent material, as indicated in Fig. 11, and are surrounded by transparent cellophane 131 in vari-colored strips so that the red in one position will be opposite the red in another position on the periphery of the rollers, as are other colors shown, so that as the rollers rotate they throw vari-colors along the inner surface of the films.

The detailed construction of these rollers and their specific arrangement of the cellophane will be made the subject-matter of a separate application but is shown in this case for the purpose of illustration.

I claim as my invention:

1. A panoramic pictorial advertising display apparatus including a housing having an open front, a skeleton frame secured in the front of said housing having rectangular openings therethrough, stationary picture plates secured in the outer rectangular openings to form a picture frame around the inner rectangular openings, moving picture units arranged in each of the inner rectangular openings, a moving picture film in each unit, a driving means including high, low and intermediate shafts in driving connection with said films whereby they can be intermittently moved to show varied panoramic pictures, and lamps moved by said driving means for lighting said stationary picture plates and moving picture films.

2. A panoramic pictorial advertising display apparatus including a housing having an open front, a skeleton frame secured in the front of said housing having rectangular openings therethrough, stationary picture plates secured in the outer rectangular openings to form a picture frame around the inner rectangular openings, moving picture units arranged in each of the inner rectangular openings, a moving picture film in each unit, a driving means including high, low and intermediate shafts in driving connection with said films whereby they can be intermittently moved to show varied panoramic pictures, and lamps moved in arcs by said driving means for lighting said stationary picture plates and moving picture films.

3. In a panoramic pictorial advertising display apparatus the combination with a housing having an open front with stationary and moving picture units arranged therein, a driving means for intermittently actuating films in the moving picture units, of electric lamps for illuminating the films of said units, and means for constantly moving said lamps in arcs for the purpose specified.

4. In a panoramic pictorial advertising display apparatus, the combination with a housing having an open front with stationary and moving picture units arranged therein, a driving means for intermittently actuating films in the moving picture units, of vertical and horizontal reflecting troughs pivotally mounted in said housing, lamps in said troughs, and means for constantly rocking said troughs.

5. In a panoramic pictorial advertising display apparatus, the combination with a housing having an open front with stationary and moving picture units arranged therein, a driving means for intermittently actuating films in the moving picture units, of pivotally mounted vertical reflecting troughs arranged adjacent the front and toward the sides of said housing, lamps in said troughs, and means for constantly rocking said troughs.

6. In a panoramic pictorial advertising display apparatus the combination with a housing having an open front, a skeleton frame in the front thereof having rectangular openings therethrough, stationary units secured in the outer openings of said frame, moving picture units in the inner opening of said frame, parallel sides to each of the moving picture units having windows therethrough, a driving means for intermittently moving the films of said moving picture units, of vertical reflecting troughs pivotally mounted adjacent the front and at the sides of said housings, lamps in said troughs, and means for constantly rocking said troughs to sweep their lights across the windows through the sides of the moving picture units to illuminate their films.

7. In a panoramic pictorial advertising display apparatus the combination with a housing having an open front, a skeleton frame in the front thereof having rectangular openings therethrough, stationary units secured in the outer openings of said frame, moving picture units in the inner opening of said frame, parallel sides to each of the moving picture units having windows therethrough, a driving means for intermittently moving the films of said moving picture units, of vertical reflecting troughs pivotally mounted in recesses adjacent the front and at the sides of said housings, lamps in said troughs, horizontal reflecting troughs extending through the sides of said moving picture units and having their ends pivotally mounted in said housing, and means for constantly rocking said vertical and horizontal troughs for the purpose specified.

8. In a panoramic pictorial advertising display apparatus the combination with a housing having an open front, a skeleton frame secured in the front of said housing having rectangular openings therethrough, stationary pictorial advertising plates removably secured in the outer openings of said frame, moving picture units having films therein, parallel sides to said moving picture units having windows therethrough, a four-speed drive for intermittently actuating the films in said moving picture units, of horizontal and vertical troughs pivotally mounted in said housing, lamps in said troughs, and means for constantly rocking said troughs to sweep the lights through the interior of said housing and through the windows of said sides to illuminate the stationary and moving picture advertising.

9. The combination set forth in claim 8 with, and glow bars adjacent the front ends of said moving picture units over which the moving picture films are extended.

10. A panoramic pictorial advertising display apparatus including a housing having an open front, a skeleton frame therein having rectangular openings therethrough, moving picture units therein, cylindrical glow bars pivotally mounted in the front ends of said units, endless motion picture films extended over said glow bars, and means for intermittently moving said films.

11. A panoramic pictorial advertising display apparatus including a housing having an open front, a skeleton frame therein, moving picture units mounted in the openings through said frame, a driving roller adjacent the rear end of each unit, a pair of transparent glow bars pivotally mounted adjacent the front end of each unit, an endless film for each unit that is extended over its respective roller and glow bars, and means for intermittently driving said rollers to actuate said films.

12. A panoramic pictorial advertising display apparatus including a housing having an open front, a skeleton frame therein, moving picture units mounted in the openings through said frame, a driving roller adjacent the rear end of each unit, a pair of transparent glow bars pivotally mounted adjacent the front end of each unit, an endless film for each unit that is extended over its respective roller and glow bars, said films being made up of detachable sections so they can be lengthened to extend over two or more units and replaceable to change the pictorial features of said films, and means for driving said rollers to drive said films.

13. The combination set forth in claim 11 with, rocking reflector troughs in said housing, lamps in said troughs, and means for constantly rocking said troughs to sweep the lights of said lamps over said films.

14. In a panoramic pictorial advertising display apparatus the combination with a housing having an open front, a skeleton frame therein, moving picture units in said frame, each unit including a drive roller at its rear end and a pair of transparent glow bars at its front end, of a moving picture film for each unit, said film formed of interchangeable sections, and metal clip bars for detachably connecting said sections.

15. The combination set forth in claim 14 with and reinforcing tapes connected to said bars substantially as described.

GUSTAVUS W. ESCHENBACH.